(No Model.)
D. R. THOMAS.
TROLLEY WHEEL AND SUPPORT.
No. 524,517. Patented Aug. 14, 1894.
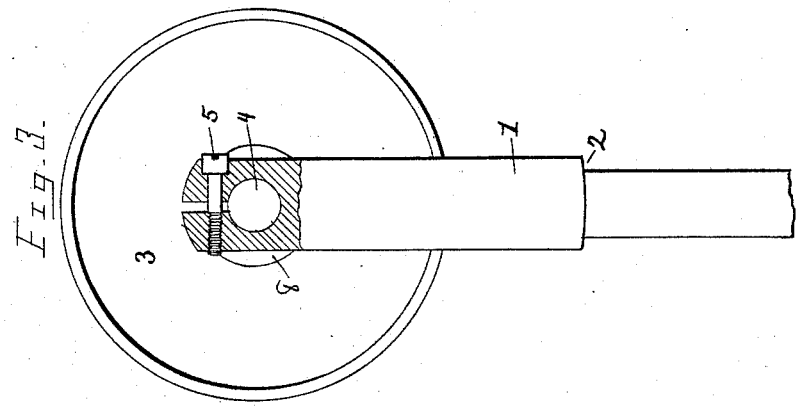
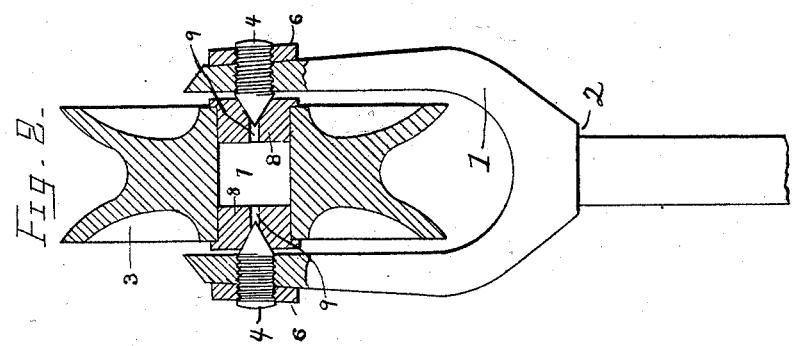
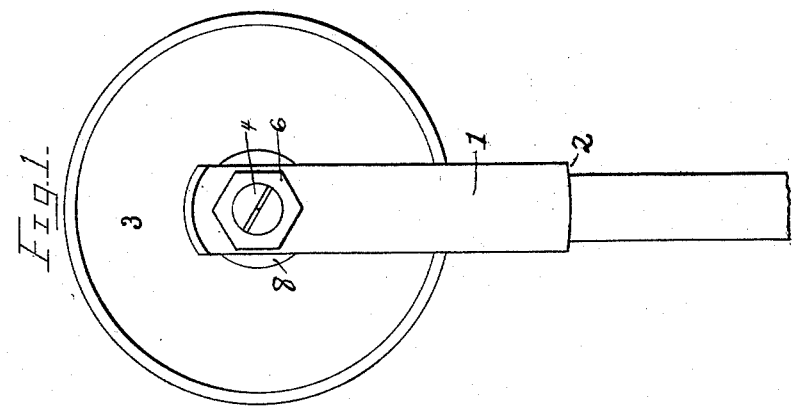
Witnesses:
W. Hamilton Edwards.
W. S. Boyd.
Inventor.
David R. Thomas,
By John E. Morris,
Attorney.

UNITED STATES PATENT OFFICE.

DAVID R. THOMAS, OF BALTIMORE, MARYLAND, ASSIGNOR OF ONE-HALF TO WILLIAM F. HARENDT, OF SAME PLACE.

TROLLEY-WHEEL AND SUPPORT.

SPECIFICATION forming part of Letters Patent No. 524,517, dated August 14, 1894.

Application filed May 26, 1894. Serial No. 512,557. (No model.)

*To all whom it may concern:*

Be it known that I, DAVID R. THOMAS, a citizen of the United States, residing at Baltimore, in the State of Maryland, have invented certain new and useful Improvements in Trolley-Wheels and Supports; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to trolley wheels and supports and has for its object to provide devices of this kind which shall be cheap, simple and efficient and it consists in the improved construction of the same as will be hereinafter more fully set forth.

Referring to the accompanying drawings, in which the same reference numerals indicate corresponding parts in each of the views, Figure 1 is a side view of a trolley wheel and support embodying my invention. Fig. 2 is a vertical transverse sectional view of the same, and Fig. 3 is a side view of a wheel and its support embodying a different means of locking the bearing for the wheel in the support.

Referring more particularly to the drawings, 1 indicates the yoke or support which is secured in any desired manner at the upper end of the trolley pole. Although this support may be of any desired material I prefer to make it of wrought or forged iron with the lower end cylindrical to fit in the socket in the trolley pole and having its upper end or yoke forked or bifurcated for the reception of the wheel.

A shoulder 2 is formed at the upper end of the cylindrial portion which rests against the upper end of the trolley pole and permits of the support swiveling therein, if desired.

The trolley wheel 3, is journaled within the yoke by two pivot points, 4, 4, which pass through the arms of the yoke near their upper ends, with their inner ends in engagement with the wheel. These pins are adjustable within the arms of the yoke so that they may be moved in or out to accommodate themselves to the size of the wheel. This may be done by means of screw threads or the upper end of each arm of the yoke may be slotted and provided with a clamping screw 5, as shown in Fig. 3. If screw threads are used, it is desirable that the pins be locked in position in some manner, as by means of jam nuts, 6, 6, which are tightened up after the pins have been adjusted to the wheel. In either case, however, the pins are fixed or stationary and the wheel rotates upon them, thus generating more or less friction at the points of contact between the wheel and the pin. As the speed of the car necessarily causes the trolley wheel to revolve with considerable of velocity, it is apparent that, unless some means are adopted to prevent it, the friction between the wheel and the pins will be considerable and the wheel soon worn out. To obviate this difficulty, I have found that by boring out the hub of the wheel to an enlarged size, as shown at 7, and plugging up each end with a short plug, 8, 8, considerable space can be left in the center of the wheel in which any desired lubricant can be stored.

Any desired means may be used for conducting this lubricant to the points of contact between the wheel and the pivot, but I prefer to bore each plug longitudinally with a small opening, 9 and providing the pivots each with a point which fits within its respective plug. By slightly enlarging or cupping the outer end of each plug, and making each pin cone shaped I secure a very good and substantial bearing with the least amount of friction. And I also provide a means for taking up any wear caused by the friction as all that is necessary is to unloosen either one or both of the pins, move them in until the wheel is properly secured, and then tighten the pins so that they will not work out by the movement of the wheel. These plugs 8, 8, may be secured in the hub of the wheel in any desired manner, but I prefer to provide the outer end of each of them with a shoulder, and then force the plug into the wheel until the shoulder rests against the side of the wheel. This makes a very cheap and effective means, and I have found it perfectly satisfactory, but if desired, the plugs could be screw threaded and fit into corresponding threads of the wheel, or be secured in any other manner. The lubricant, as graphite, or oil may be introduced into the cavity thus formed in the interior of the wheel by passing it through the holes in the plugs.

As thus described, it is evident that the current of electricity may pass directly through the wheel, through the pins, into the yoke, and from there to the trolley pole and the motor in the car in the usual manner, thus avoiding the necessity for additional contact springs or points as have heretofore been used. It also makes a very strong and durable construction as the parts can be made of sufficient strength to withstand the rough usage to which they are often subjected. And by means of the cone pivots, the wheel is not damaged nor thrown out of position by the lateral strain in passing around curves or uneven places in the trolley wire. It also makes a very cheap construction as the yoke or support may be forged in one solid integral piece, and the wheel may be cast with a sufficiently large hub, and with or without a solid web for connecting the hub and the periphery. The hub is then bored out to the desired size and the two plugs are driven in as far as they will go. The lubricant is then placed in the wheel and the wheel placed between the arms of the yoke and secured in position by means of two plain or screw threaded pivot points, and the device is ready for use.

As the chamber within the wheel may be made large enough to hold sufficient lubricant to last the life of the wheel, any further attention in supplying additional lubricant to the parts is avoided.

In operation, the lubricant, preferably graphite, is retained in the cavity of the wheel by the pivotal pins, but when the device is quickly moved to one side or the other, as in turning curves or in being carried around from one end of the car to the other, when the direction of the car is to be changed, enough of the material is thrown into and through the openings in the plugs in the hub of the wheel to properly lubricate the bearing between the wheel and the pins. As the wheel and the lubricant would move in the same direction in this case, it is evident that the wheel would press more tightly against its pivot point on that side and thus prevent the escape of more lubricant than was necessary if the wheel should be somewhat worn or loose on its bearings.

Having thus described my invention, I claim—

1. The combination with a trolley support, the outer end of which is bifurcated or formed into a yoke, of a wheel journaled therein, a plug in each end of the bore of the wheel, the outer ends of which plugs are each provided with a shoulder to fit against the side of the wheel, and the inner ends of the plugs being at a distance from each other, each plug being provided with an axial opening, and a pin adjustably secured in the outer end of each arm of the yoke, the inner end of which pin fits within the outer end of the axial opening of its respective plug and forms a support or journal for the wheel, substantially as set forth.

2. The combination with a trolley support, the outer end of which is bifurcated and the upper end of each arm of which bifurcation is perforated transversely and slotted from the perforation to the end of the arm, of a wheel journaled between said arms, a plug in each end of the bore of the wheel, the inner ends of which plugs are at a distance from each other, and each plug provided with an axial opening, a pin in the perforation of each arm, the inner ends of which pins fit within the outer ends of the axial openings of the respective plugs and form supports or journals for the wheel, and a clamping screw in the slotted portion of each arm, substantially as set forth.

In testimony whereof I affix my signature in presence of two witnesses.

DAVID R. THOMAS.

Witnesses:
  JNO. W. KOLBE,
  CHAS. L. GWINN.